Oct. 13, 1970

R. M. ALTMAN ET AL  3,533,678
ZOOM TYPE PROJECTION LENS SYSTEM HAVING
THREE MOVABLE MEMBERS AND A FINITE FOCUS
Filed April 3, 1969

RICHARD M. ALTMAN
LYNN L. VAN ORDEN
INVENTORS

BY Frank C. Parker

ATTORNEY

United States Patent Office 3,533,678
Patented Oct. 13, 1970

3,533,678
ZOOM TYPE PROJECTION LENS SYSTEM HAVING THREE MOVABLE MEMBERS AND A FINITE FOCUS
Richard M. Altman, Beverly Hills, Calif., and Lynn L. Van Orden, Holley, N.Y., assignors to Bausch & Lomb Incorporated, Rochester, N.Y., a corporation of New York
Continuation-in-part of application Ser. No. 621,960, Mar. 9, 1967. This application Apr. 3, 1969, Ser. No. 820,696
Int. Cl. G02b 15/14
U.S. Cl. 350—184          9 Claims

ABSTRACT OF THE DISCLOSURE

A projection lens system having three movable lens members, the focal length thereof being continuously variable over a magnification range or substantially 6 and working at finite conjugates.

REFERENCE TO RELATED PATENT APPLICATIONS

This application is a continuation in part of our co-pending application now abandoned, Ser. No. 621,960, filed Mar. 9, 1967.

BACKGROUND OF THE INVENTION

The present invention is related to projection lens systems of complex nature which work at fixed conjugates, and more particularly it relates to a zoom type of projection lens system having a variable equivalent focal length lying within a magnification range of substantially 6.

Such a projection lens system is used typically in projecting an image of a small film surface onto a nearby screen, so as to fill the screen regardless of the magnification used. Other kindred uses of the present invention are contemplated such as its use as a component of a projection microscope.

Zoom projection lens systems of the general kind above described are exemplified by British 17,842/97 issued to Society, Mar. 19, 1897; Mellor 2,159,394 issued May 23, 1939; and Peck et al. 3,185,029 issued May 25, 1965, none of which show the optical form of the projection lens system to be described hereinafter.

SUMMARY OF THE INVENTION

The present invention is directed particularly toward the form and arrangement and construction of the lens elements which constitute the lens system and accordingly it is an object of said invention to provide a relatively low power zoom lens system composed of three moving lens groups which are so differentially moved relatively to a fixed point on the axis thereof that the magnification of the system is varied over a range of magnification of substantially 6 while high grade imagery is preserved throughout.

It is a further object to provide such a device which projects an image of an object surface and at continuously variable magnification but constant screen brightness, the optical constructional data related to the aforesaid projection lens system being so chosen that the chromatic and monochromatic lens aberrations as well as distortion are well corrected for high grade imaging performance throughout the entire range of magnification; particularly regarding reduced secondary color.

Figure 1:
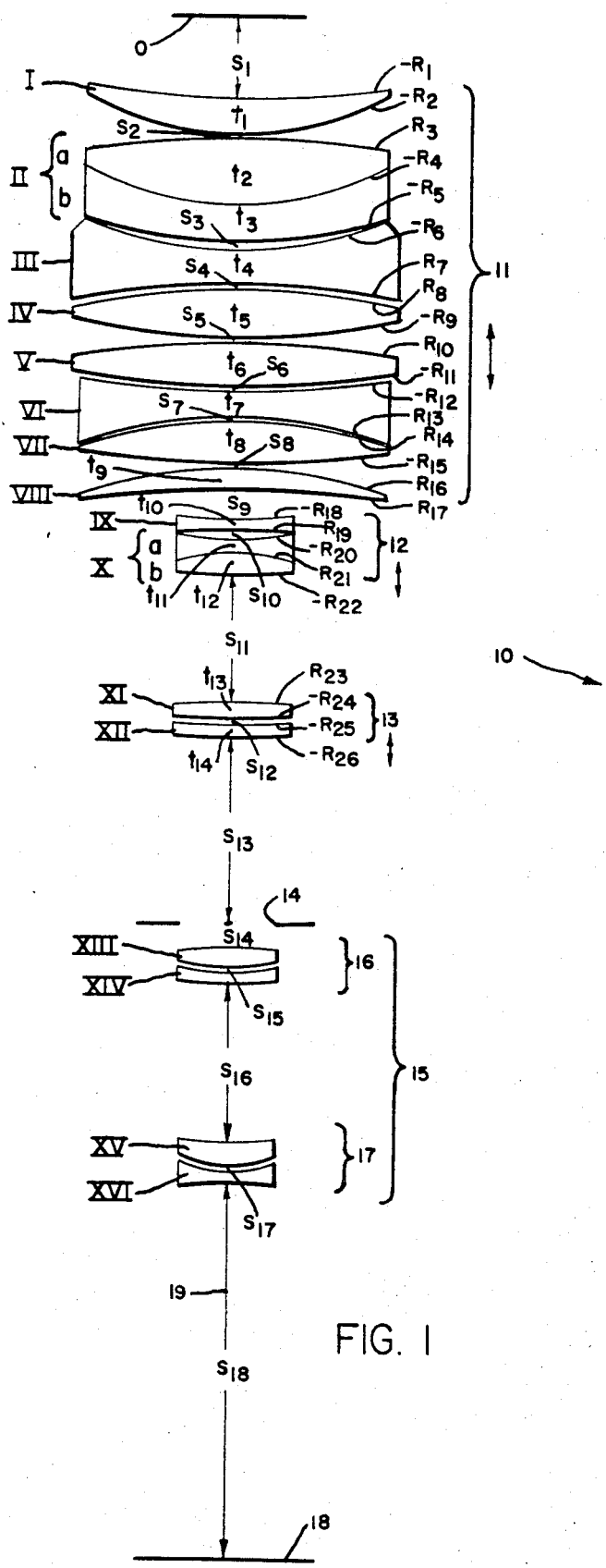
Figure 2:
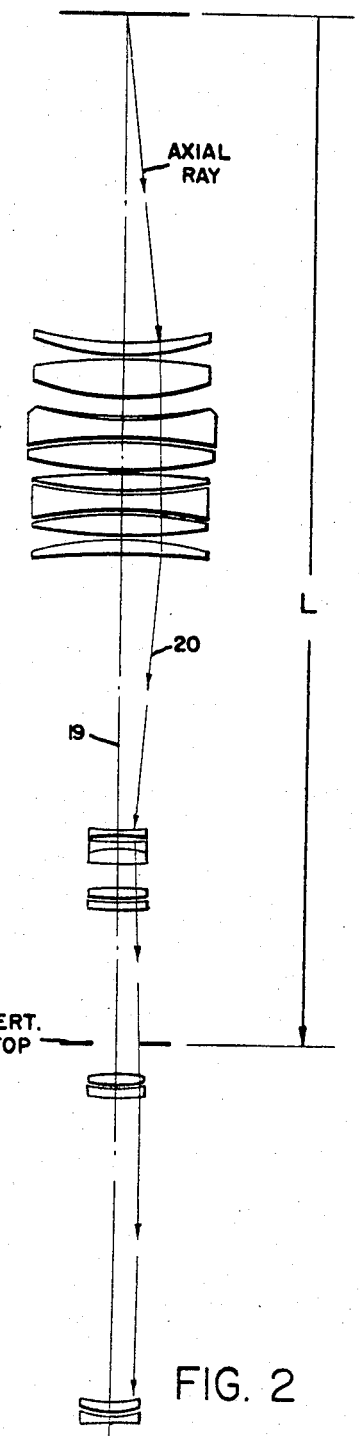

Further objects and advantages will be apparent to those skilled in the art by reference to the following specification taken in connection with the accompanying drawing wherein;

FIG. 1 is an optical diagram showing a preferred form of the present invention in one operational position, and
FIG. 2 is similar to FIG. 1 except that a second operational position of the invention is shown.

Said preferred form of the invention comprises a zoom lens system which is generally designated by numeral 10 and which works at fixed conjugates between a fixed object surface 0 and a fixed image surface designated 18. In the preferred form of the invention, the object surface 0 represents a photographic film surface having 2¼" x 2¼" format size, and an image of said film is formed on an image surface 18 which is a screen 11¼" x 11¼".

By means of the zoom lens system 10, the magnification of the image formed on screen 18 is varied between substantially 5× and 30× through a magnification range of substantially 6 while keeping the size of the image on the screen as well as the screen illumination constant.

This means that only at 5× magnification is the entire format size of the film viewed on the screen. In other words, the numerical aperture of the lens system 10 on the image side remains constant. At increased magnifications, the state of correction of the image aberrations remains excellent.

Comprised in said zoom lens system 10 is a first movable lens group 11 which is optically aligned on an optical axis 19 with a second movable lens group 12, and a third movable lens group 13 on one side of the aperture stop 14 of the lens system 10.

Optically aligned along the axis 19 with the lens groups 11, 12, and 13 on the other side of the aperture stop 14 is a fixed group of lenses 15 which focuses the image rays, one of which is shown at 20, at the fixed image plane 18.

Said first movable lens group 11 comprises a front positive singlet meniscus lens member designated I which is located at a variable axial distance $S_1$ from the object 0. Next rearwardly from lens member I is a double convex doublet lens member II which is spaced at a fixed distance $S_2$ from member I. Preferably lens member II is comprised of a front double convex lens element IIa which lies in contact with a rear concavo-convex lens element IIb of meniscus form.

In edge contact with the rear surface of lens element IIb lies a double concave lens member III, the confronting radii thereof being such that an airspace $S_3$ is provided therebetween. Rearwardly of lens member III at an axial distance $S_4$ therefrom is mounted a double convex lens member IV, and mounted rearwardly of member IV is another double convex lens member V which is spaced therefrom at an axial distance $S_5$.

Next comprised in lens group 11 is a double concave lens member VI spaced at an axial distance $S_6$ from lens member V and mounted in edge contact on its rear surface is still another double convex lens member VII, the axial airspace $S_7$ between members VI and VII being in the shape of a positive meniscus.

Located rearmost in the first movable lens group 11 is a positive meniscus singlet lens member VIII at an axial distance $S_8$ from member VII, the concave side thereof facing rearwardly.

Comprised in the second movable lens group 12 is a front double concave lens member IX which is separated from the first lens group 11 by a variable axial airspace $S_9$. Lying in edge contact with the rear surface of member IX is a doublet lens member X which is composed of a front double concave lens element Xa and a contiguous rear double convex lens element Xb. The axial airspace between members IX and X is designated $S_{10}$.

The rearmost and third movable lens group 13 is separated from the second movable lens group 12 by a variable airspace $S_{11}$. Included in said third group 13 is a front double convex lens element XI and a rear concavo-convex lens element XII, said elements being separated from each other by an axial airspace $S_{12}$. Lens group 13 is separated from the aforementioned aperture stop 14 by a variable axial airspace $S_{13}$.

With regard to the aforementioned fixed lens portion 15 of the optical system 10, there is provided a front lens group 16 which is spaced rearwardly of the aperture stop 14 at a fixed axial distance $S_{14}$. Group 16 consists of a front double convex lens member XIII and a rear concave-convex lens member XIV, the axial airspace therebetween being designated $S_{15}$.

Rearwardly of lens group 16 at a fixed axial distance $S_{16}$ is provided the rearmost lens group 17 which is composed of a front concavo-convex lens member XV and a rear double concave lens member XVI, the last two lens members being separated from each other by an axial airspace $S_{17}$. Lens member XVI is spaced ahead of the image plane 18 at an axial distance of $S_{18}$.

Having described hereabove the basic form of the novel zoom lens system 10, the optical constructional data which has been found to be successful in fulfilling the stated objects in a preferred form of the present invention are given herebelow.

Ideally the values for the equivalent focal lengths of the first movable lens group 11, second movable lens group 12 and third movable lens group 13 are respectively substantially $2.19 L_1$, $-1.10 L_1$, and $8.16 L_1$, wherein $L_1$ represents one tenth of the axial distance between the aperture stop 14 and the object surface 0. Furthermore, the ideal values for the equivalent focal lengths of the front fixed lens member 16 and rear fixed lens member 17 are respectively $2.926 L_1$ and $-1.618 L_1$.

As the result of calculation and experiment, the ranges of values for the equivalent focal lengths $F_I$ to $F_{XVI}$ of the aforementioned lens member I to XVI are given in Table I herebelow wherein the minus (−) sign denotes negative focal length, the ranges of values for the successive airspaces $S_1$ to $S_{18}$ in said system 10 being further given in said table along with the ranges of values for the successive axial lens thicknesses $t_1$ to $t_{14}$ of the lens elements in lens groups 11, 12 and 13.

Table I $5.247 L_1 < F(I) < 5.353 L_1$ $6.967 L_1 < F(II) < 7.107 L_1$ $2.863 L_1 < -F(III) < 2.921 L_1$ $3.261 L_1 < F(IV) < 3.327 L_1$ $6.905 L_1 < F(V) < 7.045 L_1$ $2.987 L_1 < -F(VI) < 3.048 L_1$ $4.369 L_1 < F(VII) < 4.457 L_1$ $5.473 L_1 < F(VIII) < 5.584 L_1$ $0.922 L_1 < -F(IX) < 0.941 L_1$ $7.454 L_1 < F(X) < 7.604 L_1$ $2.747 L_1 < F(XI) < 2.802 L_1$ $4.159 L_1 < -F(XII) < 4.243 L_1$ $1.065 L_1 < F(XIII) < 1.086 L_1$ $1.628 L_1 < -F(XIV) < 1.661 L_1$ $1.178 L_1 < F(XV) < 1.201 L_1$ $0.686 L_1 < -F(XVI) < 0.700 L_1$ $2.1689 L_1 < S_1 < 2.2128 L_1$ at $5\times$ magnification $5.2336 L_1 < S_1 < 5.3393 L_1$ at $9\times$ magnification $3.8408 L_1 < S_1 < 3.9184 L_1$ at $16.5\times$ magnification $2.9006 L_1 < S_1 < 2.9592 L_1$ at $30\times$ magnification $.0140 L_1 < S_2 < .0143 L_1$ $.0376 L_1 < S_3 < .0383 L_1$ $.0179 L_1 < S_4 < .0182 L_1$ $.0140 L_1 < S_5 < .0143 L_1$ $S_6 > .0069 L_1$ $.0159 L_1 < S_7 < .0162 L_1$ $.0140 L_1 < S_8 < .0143 L_1$ $.1528 L_1 < S_9 < .1559 L_1$ at $5\times$ magnification $.6723 L_1 < S_9 < .6858 L_1$ at $9\times$ magnification $1.5411 L_1 < S_9 < 1.5722 L_1$ at $16.5\times$ magnification $2.7364 L_1 < S_9 < 2.7917 L_1$ at $30\times$ magnification $.0557 L_1 < S_{10} < .0568 L_1$ $.6897 L_1 < S_{11} < .7036 L_1$ at $5\times$ magnification $1.1869 L_1 < S_{11} < 1.2109 L_1$ at $9\times$ magnification $.0457 L_1 < S_{11} < .0467 L_1$ at $16.5\times$ magnification $.2518 L_1 < S_{11} < .2569 L_1$ at $30\times$ magnification $.0279 L_1 < S_{12} < .0285 L_1$ $4.3318 L_1 < S_{13} < 4.4193 L_1$ at $5\times$ magnification $.2505 L_1 < S_{13} < .2556 L_1$ at $9\times$ magnification $1.5040 L_1 < S_{13} < 1.5344 L_1$ at $16.5\times$ magnification $1.4544 L_1 < S_{13} < 1.4838 L_1$ at $30\times$ magnification $.1396 L_1 < S_{14} < .1425 L_1$ $.0296 L_1 < S_{15} < .0302 L_1$ $2.9616 L_1 < S_{16} < 3.0214 L_1$ $.0279 L_1 < S_{17} < .0285 L_1$ $18.1946 L_1 < S_{18} < 18.5622 L_1$ $.1676 L_1 < t_1 < .1709 L_1$ $.3631 L_1 < t_2 < .3704 L_1$ $.1676 L_1 < t_3 < .1709 L_1$ $.1955 L_1 < t_4 < .1994 L_1$ $.2933 L_1 < t_5 < .2992 L_1$ $.1955 L_1 < t_6 < .1994 L_1$ $.1676 L_1 < t_7 < .1709 L_1$ $.2374 L_1 < t_8 < .2422 L_1$ $.1676 L_1 < t_9 < .1709 L_1$ $.0559 L_1 < t_{10} < .0570 L_1$ $.0559 L_1 < t_{11} < .0570 L_1$ $.1326 L_1 < t_{12} < .1353 L_1$ $.0768 L_1 < t_{13} < .0784 L_1$ $.0768 L_1 < t_{14} < .0784 L_1$ With regard to Table I, it will be seen that the value of each lens parameter is given in the form of a range of values which include a nominal or ideal value. All of said ranges are so stated for the primary purpose of paralleling the practices used in manufacturing the lens elements.

It is well known in the lens making art that it is practically impossible to manufacture a production run of lens elements economically while holding all of the lens parameters to specific and ideal values. Therefore, the lens designer specifies tolerances or ranges of values for each lens parameter within which the lens parts may be manufactured economically while nevertheless permitting the production of a completed objective which is capable of good optical performance.

The technique used by the manufacturer is to separate out the lens elements which fall within the established ranges of values and under the supervision of skilled opticians selectively assemble from these elements a complete objective 10. This technique is highly successful in producing economically a good lens system having an optical performance suited to its use.

In Table II herebelow, the absolute values in ranges for the refractive indices $n_D$ (I) to $n_D$ (XII) as well as the absolute values in ranges for the Abbe $\nu$ number of the successive lens elements I to XII are given,

TABLE II

| | |
|---|---|
| $1.5130 < n_D$ (I) $< 1.5150$ | $69.7 < \nu$ (I) $< 70.7$ |
| $1.5130 < n_D$ (IIa) $< 1.5150$ | $69.7 < \nu$ (IIa) $< 70.7$ |
| $1.6115 < n_D$ (IIb) $< 1.6145$ | $43.9 < \nu$ (IIb) $< 44.5$ |
| $1.6115 < n_D$ (III) $< 1.6145$ | $43.9 < \nu$ (III) $< 44.5$ |
| $1.5130 < n_D$ (IV) $< 1.5150$ | $69.7 < \nu$ (IV) $< 70.7$ |
| $1.5130 < n_D$ (V) $< 1.5150$ | $69.7 < \nu$ (V) $< 70.7$ |
| $1.6115 < n_D$ (VI) $< 1.6145$ | $43.9 < \nu$ (VI) $< 44.5$ |
| $1.5130 < n_D$ (VII) $< 1.5150$ | $69.7 < \nu$ (VII) $< 70.7$ |
| $1.5130 < n_D$ (VIII) $< 1.5150$ | $69.7 < \nu$ (VIII) $< 70.7$ |
| $1.6115 < n_D$ (XI) $< 1.6145$ | $43.9 < \nu$ (IX) $< 44.5$ |
| $1.6115 < n_D$ (Xa) $< 1.6145$ | $43.9 < \nu$ (Xa) $< 44.5$ |
| $1.7490 < n_D$ (Xb) $< 1.7510$ | $27.6 < \nu$ (Xb) $< 28.0$ |
| $1.5130 < n_D$ (XI) $< 1.5150$ | $69.7 < \nu$ (XI) $< 70.7$ |
| $1.6115 < n_D$ (XII) $< 1.6145$ | $43.9 < \nu$ (XII) $< 44.5$ |

Furthermore values in ranges and in terms of $L_1$ are given in Table III herebelow for the successive radii of the lens surfaces $-R_1$ to $-R_{26}$ on the lens elements I to XII, the minus (—) sign designating those surfaces which have their centers of curvature on the object side of that surface.

TABLE III $6.5535 \ L_1 < -R_1 < 6.6875 \ L_1$ $1.9271 \ L_1 < -R_2 < 1.9659 \ L_1$ $9.1416 \ L_1 < R_3 < 9.3262 \ L_1$ $1.6855 \ L_1 < -R_4 < 1.7195 \ L_1$ $4.1725 \ L_1 < -R_5 < 4.2587 \ L_1$ $2.8119 \ L_1 < -R_6 < 2.8687 \ L_1$ $4.7976 \ L_1 < R_7 < 4.8944 \ L_1$ $3.8639 \ L_1 < R_8 < 3.9419 \ L_1$ $2.8849 \ L_1 < -R_9 < 2.9421 \ L_1$ $8.9637 \ L_1 < R_{10} < 9.1447 \ L_1$ $5.8273 \ L_1 < -R_{11} < 5.9449 \ L_1$ $6.0200 \ L_1 < -R_{12} < 6.1416 \ L_1$ $2.6609 \ L_1 < R_{13} < 2.7145 \ L_1$ $3.0271 \ L_1 < R_{14} < 3.0881 \ L_1$ $8.4777 \ L_1 < -R_{15} < 8.6489 \ L_1$ $2.5318 \ L_1 < R_{16} < 2.5828 \ L_1$ $24.7183 \ L_1 < R_{17} < 25.2175 \ L_1$ $1.1648 \ L_1 < -R_{18} < 1.1882 \ L_1$ $1.1183 \ L_1 < R_{19} < 1.1407 \ L_1$ $2.6114 \ L_1 < -R_{20} < 2.6640 \ L_1$ $.6074 \ L_1 < R_{21} < .6196 \ L_1$ $5.3860 \ L_1 < -R_{22} < 5.4948 \ L_1$ $16.7893 \ L_1 < R_{23} < 17.1283 \ L_1$ $1.5389 \ L_1 < -R_{24} < 1.5699 \ L_1$ $1.5361 \ L_1 < -R_{25} < 1.5671 \ L_1$ $3.9379 \ L_1 < -R_{26} < 4.0204 \ L_1$

It will be understood that the parts of the total lens system 10, which are dimensionally and otherwise specified in Tables I, II and III, constitute the "zooming" members, and said parts may be combined with a fixed lens assembly 15 of different optical form than that which is shown and described herein under the condition that the fixed lenses together with the movable lenses form an image on the screen surface lying at 18. Therefore, the illustrated and described fixed lens portion 15 may be considered to be a preferred successful form and is not inclusive.

The principal constructional data for the rear or fixed lenses 16 and 17 is given in Table IV herebelow wherein F(XIII) to —F(XVI) represent the equivalent focal lengths of the lens members XIII to XVI respectively, and $S_{14}$ to $S_{18}$ represent the fixed axial distances which successively occur between the aperture diaphragm 14 and image plane 18.

TABLE IV $1.065 \ L_1 < F(XIII) < 1.086 \ L_1$ $1.628 \ L_1 < -F(XIV) < 1.661 \ L_1$ $1.177 \ L_1 < F(XV) < 1.201 \ L_1$ $0.686 \ L_1 < -(XVI) < 0.700 \ L_1$ $.1396 \ L_1 < S_{14} < .1425 \ L_1$ $.0296 \ L_1 < S_{15} < .0302 \ L_1$ $2.9616 \ L_1 < S_{16} < 3.0214 \ L_1$ $.0279 \ L_1 < S_{17} < .0285 \ L_1$ $18.1946 \ L_1 < S_{18} < 18.5622 \ L_1$

In Table V given herebelow, the aforementioned nominal or ideal values for all of the constructional parameters found in the previous four tables is given substantially in terms of $L_1$ except the values for the refractive index $n_D$ and Abbe number $\gamma$ which have absolute values.

TABLE V

| | |
|---|---|
| $F(I) = 5.300 \ L_1$ | $S_1 = 2.1908 \ L_1$ at 5× mag. |
| $F(II) = 7.037 \ L_1$ | $S_1 = 5.2864 \ L_1$ at 9× mag. |
| $-F(III) = 2.891 \ L_1$ | $S_1 = 3.8795 \ L_1$ at 16.5× mag. |
| $F(IV) = 3.294 \ L_1$ | $S_1 = 2.9299 \ L_1$ at 30× mag. |
| $F(V) = 6.975 \ L_1$ | $S_2 = .0141 \ L_1$ |
| $-F(VI) = 3.018 \ L_1$ | $S_3 = .0380 \ L_1$ |
| $F(VII) = 4.413 \ L_1$ | $S_4 = .0181 \ L_1$ |
| $F(VIII) = 5.529 \ L_1$ | $S_5 = .0141 \ L_1$ |
| $-F(IX) = 0.931 \ L_1$ | $S_6 = .0071 \ L_1$ |
| $F(X) = 7.529 \ L_1$ | $S_7 = .0160 \ L_1$ |
| $F(XI) = 2.774 \ L_1$ | $S_8 = .0141 \ L_1$ |
| $-F(XII) = 4.201 \ L_1$ | $S_9 = .1543 \ L_1$ at 5 × mag. |
| $F(XIII) = 1.076 \ L_1$ | $S_9 = .6790 \ L_1$ at 9 × mag. |
| $-F(XIV) = 1.644 \ L_1$ | $S_9 = 1.5566 \ L_1$ at 16.5× mag. |
| $F(VX) = 1.189 \ L_1$ | $S_9 = 2.7640 \ L_1$ at 30× mag. |
| $-F(XVI) = 0.693 \ L_1$ | $S_{10} = .0562 \ L_1$ |
| $t_1 = .1692 \ L_1$ | $S_{11} = .6966 \ L_1$ at 5× mag. |
| $t_2 = .3667 \ L_1$ | $S_{11} = 1.1989 \ L_1$ at 9× mag. |
| $t_3 = .1692 \ L_1$ | $S_{11} = .4620 \ L_1$ at 16.5× mag. |
| $t_4 = .1974 \ L_1$ | $S_{11} = .2544 \ L_1$ at 30× mag. |
| $t_5 = .2962 \ L_1$ | $S_{12} = .0282 \ L_1$ |
| $t_6 = .1974 \ L_1$ | $S_{13} = 4.3756 \ L_1$ at 5× mag. |
| $t_7 = .1692 \ L_1$ | $S_{13} = .2531 \ L_1$ at 9× mag. |
| $t_8 = .2397 \ L_1$ | $S_{13} = 1.5192 \ L_1$ at 16.5× mag. |
| $t_9 = .1692 \ L_1$ | $S_{13} = 1.4691 \ L_1$ at 30× mag. |
| $t_{10} = .0564 \ L_1$ | $S_{14} = .1410 \ L_1$ |
| $t_{11} = .0564 \ L_1$ | $S_{15} = .0299 \ L_1$ |
| $t_{12} = .1340 \ L_1$ | $S_{16} = 2.9915 \ L_1$ |
| $t_{13} = .0776 \ L_1$ | $S_{17} = .0282 \ L_1$ |
| $t_{14} = .0776 \ L_1$ | $S_{18} = 18.3784 \ L_1$ |
| $-R_1 = 6.6196 \ L_1$ | $n_D$ (I) $= 1.514$ |
| $-R_2 = 1.9465 \ L_1$ | $n_D$ (IIa) $= 1.514$ |
| $R_3 = 9.2339 \ L_1$ | $n_D$ (IIb) $= 1.613$ |
| $-R_4 = 1.7025 \ L_1$ | $n_D$ (III) $= 1.613$ |
| $-R_5 = 4.2146 \ L_1$ | $n_D$ (IV) $= 1.514$ |
| $-R_6 = 2.8404 \ L_1$ | $n_D$ (V) $= 1.514$ |
| $R_7 = 4.8460 \ L_1$ | $n_D$ (VI) $= 1.613$ |
| $R_8 = 3.9029 \ L_1$ | $n_D$ (VII) $= 1.514$ |
| $-R_9 = 2.9130 \ L_1$ | $n_D$ (VIII) $= 1.514$ |
| $R_{10} = 9.0542 \ L_1$ | $n_D$ (IX) $= 1.613$ |
| $-R_{11} = 5.8861 \ L_1$, | $n_D$ (Xa) $= 1.613$ |
| $-R_{12} = 6.0808 \ L_1$ | $n_D$ (Xb) $= 1.751$ |
| | $n_D$ (XI) $= 1.514$ |
| | $n_D$ (XII) $= 1.613$ |
| $R_{13} = 2.6878 \ L_1$ | $\nu$(I) $= 70.2$ |
| $R_{14} = 3.0576 \ L_1$ | $\nu$(IIa) $= 70.2$ |
| $-R_{15} = 8.5634 \ L_1$ | $\nu$(IIb) $= 44.2$ |
| $R_{16} = 2.5573 \ L_1$ | $\nu$(III) $= 44.2$ |
| $R_{17} = 24.9679, L_1$ | $\nu$(IV) $= 70.2$ |
| $-R_{18} = 1.1765 \ L_1$ | $\nu$(V) $= 70.2$ |
| $R_{19} = 1.1295 \ L_1$ | $\nu$(VI) $= 44.2$ |
| $-R_{20} = 2.6377 \ L_1$ | $\nu$(VII) $= 70.2$ |
| $R_{21} = .6136 \ L_1$ | $\nu$(VIII) $= 70.2$ |
| $-R_{22} = 5.4404 \ L_1$ | $\nu$(IX) $= 44.2$ |
| $R_{23} = 16.9588 \ L_1$ | $\nu$(Xa) $= 44.2$ |
| $-R_{24} = 1.5544 \ L_1$ | $\nu$(Xb) $= 27.8$ |
| $-R_{25} = 1.5516, L_1$ | $\nu$(XI) $= 70.2$ |
| $-R_{26} = 3.9805 \ L_1$ | $\nu$(XII) $= 44.2$ |

When the constructional parameters have substantially the values given in Table V the values for the focal lengths F(IIa) and —F(IIb) have a numerical relationship as stated herebelow.

$$\frac{F(IIa)}{F(IIb)} = .59 \text{ substantially}$$

Also, the values for the focal lengths —F(Xa) and F(Xb) have a numerical relationship as stated herebelow.

$$\frac{F(Xa)}{F(Xb)} = 1.09 \text{ substantially}$$

Although only a preferred form of the present invention is shown and described in detail, other forms are possible and changes may be made in the specific values of the constructional data herein set forth within the ranges of values stated without departing from the spirit of the invention.

We claim:

1. A zoom type of projection lens system which includes three differentially movable lens members which are moved between fixed object and image position according to such a law that the magnification of the image formed is constant in border size although it is varied in magnification through a continuous magnification range of substantially 6, said image being well corrected and substantially stationary, said system including
   a first axially movable lens group which is spaced from said object surface at a variable axial distance designated $S_1$,
   a second axially movable lens group which is spaced from said first group at a variable axial distance designated $S_9$, and
   a third axially movable lens group which is spaced from said second group at a variable axial distance designated $S_{11}$, said groups being optically aligned on one side of the aperture stop of said system on the opposite side from at least one fixed projection lens group which forms said image at a fixed position, said first movable lens group comprising
   a front singlet meniscus lens member designated I which is concave toward said object surface,
   a double convex doublet lens member designated II which is spaced rearwardly of member I at a fixed axial distance designated $S_2$,
   a double concave lens member designated III which has a front surface of short curvature so that it lies in edge contact with lens member II,
   a double convex lens member designated IV which is spaced at a fixed axial distance designated $S_4$ from member III,
   another double convex lens member designated V which is spaced at a fixed axial distance designated $S_5$ from member IV,
   a second double concave lens member designated VI which is spaced at a fixed axial distance designated $S_6$ from member V,
   a third double convex lens member designated VII which has a refracting surface which is flatter than the adjacent surface of member VI and has edge contact therewith, and
   a rearmost singlet meniscus lens member designated VIII which is concave toward said images and is spaced at a fixed axial distance designated $S_8$ from member VII,
   said second movable lens group comprising a front double concave singlet lens member designated IX and a positive meniscus doublet lens member designated X which is concave toward and lies in edge contact with member IX,
   and third movable lens group comprising a front double convex lens member designated XI and,
   a rear meniscus lens member designated XII which is concave toward member XI and is spaced therefrom at a fixed axial distance designed $S_{12}$, the variable airspace between member XII and said aperture stop being designated $S_{13}$, the values for the focal lengths F(I) to F(XII) of the successive lens members I to XII respectively being substantially as given in the table herebelow in terms of $L_1$ which represents .1 of the axial length from said object surface to said aperture stop, the minus (—) sign meaning negative focal length and the successive airspaces $S_1$ to $S_{13}$ in said system having values in terms of $L_1$ as given in said table, $5.247\ L_1 < F(I) < 5.353\ L_1$ $6.967\ L_1 < F(II) < 7.107\ L_1$ $2.863\ L_1 < -F(III) < 2.921\ L_1$ $3.261\ L_1 < F(IV) < 3.327\ L_1$ $6.905\ L_1 < F(V) < 7.045\ L_1$ $2.987\ L_1 < -F(VI) < 3.048\ L_1$ $4.369\ L_1 < F(VII) < 4.457\ L_1$ $5.473\ L_1 < F(VIII) < 5.584\ L_1$ $0.922\ L_1 < -F(IX) < 0.941\ L_1$ $7.454\ L_1 < F(X) < 7.604\ L_1$ $2.747\ L_1 < F(XI) < 2.802\ L_1$ $4.159\ L_1 < -F(XII) < 4.243\ L_1$ $2.1689\ L_1 < S_1 < 2.2128\ L_1\ (5\times)$ $5.2336\ L_1 < S_1 < 5.3393\ L_1\ (9\times)$ $3.8408\ L_1 < S_1 < 3.9184\ L_1\ (16.5\times)$ $2.9006\ L_1 < S_1 < 2.9592\ L_1\ (30\times)$ $.0140\ L_1 < S_2 < .0143\ L_1$ $.0179\ L_1 < S_4 < .0182\ L_1$ $.0140\ L_1 < S_5 < .0143\ L_1$ $S_6 > .0069\ L_1$ $.0140\ L_1 < S_8 < .0143\ L_1$ $.1528\ L_1 < S_9 < .1559\ L_1\ (5\times)$ $.6723\ L_1 < S_9 < .6858\ L_1\ (9\times)$ $1.5411\ L_1 < S_9 < 1.5722\ L_1\ (16.5\times)$ $2.7364\ L_1 < S_9 < 2.7917\ L_1\ (30\times)$ $.6897\ L_1 < S_{11} < .7036\ L_1\ (5\times)$ $1.1869\ L_1 < S_{11} < 1.2109\ L_1\ (9\times)$ $0.457\ L_1 < S_{11} < .0467\ L_1\ (16.5\times)$ $.2518\ L_1 < S_{11} < .2569\ L_1\ (30\times)$ $.0279\ L_1 < S_{12} < .0285\ L_1$ $4.3318\ L_1 < S_{13} < 4.4193\ L_1\ (5\times)$ $.2505\ L_1 < S_{13} < .2556\ L_1\ (9\times)$ $1.5040\ L_1 < S_{13} < 1.5344\ L_1\ (16.5\times)$ $1.4544\ L_1 < S_{13} < 1.4838\ L_1\ (30\times)$ 2. A zoom type of projection lens system which includes three differentially movable lens members which are moved between fixed object and image positions according to such a law that the magnification of the image formed is constant in border size although it is varied in magnification through a continuous magnification range of substantially 6, said image being well corrected and substantially stationary, said system including
   a first axially movable lens group which is spaced from said object surface at a variable axial distance designated $S_1$,
   a second axially movable lens group which is spaced from said first group at a variable axial distance designated $S_9$, and
   a third axially movable lens group which is spaced from said second group at a variable axial distance designated $S_{11}$, said groups being optically aligned on one side of the aperture stop of said system on the opposite side from at least one fixed projection lens group which forms said image at a fixed position,
said first movable lens group comprising
a front singlet meniscus lens member designated I which is concave toward said object surface,
a double convex doublet lens member designated II which is spaced rearwardly of member I at a fixed axial distance designated $S_2$,
a double concave lens member designated III which has a front surface of short curvature so that it lies in edge contact with lens member II,
a double convex lens member designated IV which is spaced at a fixed axial distance designated $S_4$ from member III,
another double convex lens member designated V which is spaced at a fixed axial distance designated $S_5$ from member IV,
a second double concave lens member designated VI which is spaced at a fixed axial distance designated $S_6$ from member V,
a third double convex lens member designated VII which has a refracting surface which is flatter than the adjacent surface of member VI and has edge contact therewith, and
a rearmost singlet meniscus lens member designated VIII which is concave toward said images and is spaced at a fixed axial distance designated $S_8$ from member VII,
said second movable lens group comprising a front double concave singlet lens member designated IX and a positive meniscus doublet lens member designated X which is concave toward and lies in edge contact with member IX,
said third movable lens groups comprising a front double convex lens member designated XI and,
a rear meniscus lens member designated XII which is concave toward member XI and is spaced therefrom at a fixed axial distance designated $S_{12}$, the variable airspace between member XII and said aperture stop being designated $S_{13}$,
the values for the focal lengths F(I) to F(XII) of the successive lens members I to XII respectively being substantially as given in the table herebelow in terms of $L_1$ which represents .1 of the axial length from said object surface to said aperture stop, the minus (—) sign meaning negative focal length, the values furthermore being given in terms of $L_1$ substantially for the successive airspaces $S_1$ to $S_{13}$, the successive axial thicknesses $t_1$ to $t_{14}$ of the aforesaid lens members, $t_2$ and $t_3$ being related to the positive and negative lens elements respectively in member II, and $t_{11}$ and $t_{12}$ being related to the negative and positive lens elements respectively in member X, the corresponding values for the refractive index $n_D$ and Abbe number $\nu$ being given herebelow in absolute values for the successive lens parts, $5.247\ L_1 < F(I) < 5.353\ L_1$ $6.967\ L_1 < F(II) < 7.107\ L_1$ $2.863\ L_1 < -F(III) < 2.921\ L_1$ $3.261\ L_1 < F(IV) < 3.327\ L_1$ $6.905\ L_1 < F(V) < 7.045\ L_1$ $2.987\ L_1 < -F(VI) < 3.048\ L_1$ $4.369\ L_1 < F(VII) < 4.457\ L_1$ $5.473\ L_1 < F(VIII) < 5.584\ L_1$ $0.922\ L_1 < -F(IX) < 0.941\ L_1$ $7.454\ L_1 < F(X) < 7.604\ L_1$ $2.747\ L_1 < F(XI) < 2.802\ L_1$ $4.159\ L_1 < -F(XII) < 4.243\ L_1$ $2.1689\ L_1 < S_1 < 2.2128\ L_1 (5\times)$ $5.2336\ L_1 < S_1 < 5.3393\ L_1 (9\times)$ $3.8408\ L_1 < S_1 < 3.9184\ L_1 (16.5\times)$ $2.9006\ L_1 < S_1 < 2.9592\ L_1 (30.0\times)$ $.0140\ L_1 < S_2 < .0143\ L_1$ $.0179\ L_1 < S_4 < .0182\ L_1$ $.0140\ L_1 < S_5 < .0143\ L_1$ $S_6 > .0069\ L_1$ $.0140\ L_1 < S_8 < .0143\ L_1$ $.1528\ L_1 < S_9 < .1559\ L_1 (5\times)$ $.6723\ L_1 < S_9 < .6858\ L_1 (9\times)$ $1.5411\ L_1 < S_9 < 1.5722\ L_1 (16.5\times)$ $2.7364\ L_1 < S_9 < 2.7917\ L_1 (30\times)$ $.6897\ L_1 < S_{11} < .7036\ L_1 (5\times)$ $1.1869\ L_1 < S_{11} < 1.2109\ L_1 (9\times)$ $.0457\ L_1 < S_{11} < .0467\ L_1 (16.5\times)$ $.2518\ L_1 < S_{11} < .2569\ L_1 (30\times)$ $.0279\ L_1 < S_{12} < .0285\ L_1$ $4.3318\ L_1 < S_{13} < 4.4193\ L_1 (5\times)$ $.2505\ L_1 < S_{13} < .2556\ L_1 (9\times)$ $1.5040\ L_1 < S_{13} < 1.5344\ L_1 (16.5\times)$ $1.4544\ L_1 < S_{13} < 1.4838\ L_1 (30\times)$ $.1676\ L_1 < t_1 < .1709\ L_1$ $.3631\ L_1 < t_2 < .3704\ L_1$ $.1676\ L_1 < t_3 < .1709\ L_1$ $.1955\ L_1 < t_4 < .1994\ L_1$ $.2933\ L_1 < t_5 < .2992\ L_1$ $.1955\ L_1 < t_6 < .1994\ L_1$ $.1676\ L_1 < t_7 < .1709\ L_1$ $.2374\ L_1 < t_8 < .2422\ L_1$ $.1676\ L_1 < t_9 < .1709\ L_1$ $.0559\ L_1 < t_{10} < .0570\ L_1$ $.0559\ L_1 < t_{11} < .0570\ L_1$ $.1326\ L_1 < t_{12} < .1353\ L_1$ $.0768\ L_1 < t_{13} < .0784\ L_1$ $.0768\ L_1 < t_{14} < .0784\ L_1$ $1.5130 < n_D\ (II) < 1.5150$ $1.5130 < n_D\ (II\ pos.) < 1.5150$ $1.6115 < n_D\ (III\ neg.) < 1.6145$ $1.6115 < n_D\ (III) < 1.6145$ $1.5130 < n_D\ (IV) < 1.5150$ $1.5130 < n_D\ (V) < 1.5150$ $1.6115 < n_D\ (VI) < 1.6145$ $1.5130 < n_D\ (VII) < 1.5150$ $1.5130 < n_D\ (VIII) < 1.5150$ $1.6115 < n_D\ (IX) < 1.6145$ $1.6115 < n_D\ (X\ neg.) < 1.6145$ $1.7490 < n_D\ (X\ pos.) < 1.7510$ $1.5130 < n_D\ (XI) < 1.5150$ $1.6115 < n_D\ (XII) < 1.6145$ $69.7 < \nu\ (I) < 70.7$ $69.7 < \nu\ (II\ pos.) < 70.7$ $43.9 < \nu\ (II\ neg.) < 44.5$ $43.9 < \nu \text{ (III)} < 44.5$ $69.7 < \nu \text{ (IV)} < 70.7$ $69.7 < \nu \text{ (V)} < 70.7$ $43.9 < \nu \text{ (VI)} < 44.5$ $69.7 < \nu \text{ (VII)} < 70.7$ $69.7 < \nu \text{ (VIII)} < 70.7$ $43.9 < \nu \text{ (IX)} < 44.5$ $43.9 < \nu \text{ (X neg.)} < 44.5$ $27.6 < \nu \text{ (X pos.)} < 28.0$ $69.7 < \nu \text{ (XI)} < 70.7$ $43.9 < \nu \text{ (XII)} < 44.5$ 3. A zoom type of projection lens system which includes three differentially movable lens members which are moved between fixed object and image positions according to such a law that the magnification of the image formed is constant in border size although it is varied in magnification through a continuous magnification range of substantially 6, said image being well corrected and substantially stationary, said system including
  a first axially movable lens group which is spaced from said object surface at a variable axial distance designated $S_1$,
  a second axially movable lens group which is spaced from said first group at a variable axial distance designated $S_9$, and
  a third axially movable lens group which is spaced from said second group at a variable axial distance designated $S_{11}$, said groups being optically aligned on one side of the aperture stop of said system on the opposite side from at least one fixed projection lens group which forms said image at a fixed position,
said first movable lens group comprising
  a front singlet meniscus lens member designated I which is concave toward said object surface,
  a double convex doublet lens member designated II which is spaced rearwardly of member I at a fixed axial distance designated $S_2$,
  a double concave lens member designated III which has a front surface of short curvature so that it lies in edge contact with lens member II,
  a double convex lens member designated IV which is spaced at a fixed axial distance designated $S_4$ from member III,
  another double convex lens member designated V which is spaced at a fixed axial distance designated $S_5$ from member IV,
  a second double concave lens member designated VI which is spaced at a fixed axial distance designated $S_6$ from member V,
  a third double convex lens member designated VII which has a refracting surface which is flatter than the adjacent surface of member VI and has edge contact therewith, and
  a rearmost singlet meniscus lens member designated VIII which is concave toward said image and is spaced at a fixed axial distance designated $S_8$ from member VII,
said second movable lens group comprising a front double concave singlet lens member designated IX and a positive meniscus doublet lens member designated X which is concave toward and lies in edge contact with member IX,
said third movable lens group comprising a front double convex lens member designated XI, and
  a rear meniscus lens member designated XII which is concave toward member XI and is spaced therefrom at a fixed axial distance designated $S_{12}$, the variable airspace between member XII and said aperture stop being designated $S_{13}$, the values for the radii which are designated $R_1$ to $R_{26}$ respectively for the successive lens members I to XII being given in terms of $L_1$ which represents one tenth of the axial length between the object plane and the aperture stop of said system, the minus (—) sign being used for those lens surfaces whose centers of curvature lie on the front side of the respective surfaces, the values furthermore being given in terms of $L_1$ for the successive airspaces designated $S_1$ to $S_{13}$, the values of the successive axial thicknesses of lens members I to XII which are designated $t_1$ to $t_{14}$ being given in the table in terms of $L_1$ along with the absolute values of refractive index $n_D$ and Abbe number $\nu$ for the aforesaid lenses, $6.5535 \ L_1 < -R_1 < 6.6857 \ L_1$ $1.9271 \ L_1 < -R_2 < 1.9659 \ L_1$ $9.1416 \ L_1 < R_3 < 9.3262 \ L_1$ $1.6855 \ L_1 < -R_4 < 1.7195 \ L_1$ $4.1725 \ L_1 < -R_5 < 4.2587 \ L_1$ $2.8119 \ L_1 < -R_6 < 2.8687 \ L_1$ $4.7976 \ L_1 < R_7 < 4.8944 \ L_1$ $3.8639 \ L_1 < R_8 < 3.9419 \ L_1$ $2.8849 \ L_1 < -R_9 < 2.9421 \ L_1$ $8.9637 \ L_1 < R_{10} < 9.1447 \ L_1$ $5.8273 \ L_1 < -R_{11} < 5.9449 \ L_1$ $6.0200 \ L_1 < -R_{12} < 6.1416 \ L_1$ $2.6609 L_1 < R_{13} < 2.7145 \ L_1$ $3.0271 \ L_1 < R_{14} < 3.0881 \ L_1$ $8.4777 \ L_1 < -R_{15} < 8.6489 \ L_1$ $2.5318 \ L_1 < R_{16} < 2.5828 \ L_1$ $24.7183 \ L_1 < R_{17} < 25.2175 \ L_1$ $1.1648 \ L_1 < -R_{18} < 1.1822 \ L_1$ $1.1183 \ L_1 < R_{19} < 1.1407 \ L_1$ $2.6114 \ L_1 < -R_{20} < 2.6640 \ L_1$ $.6074 \ L_1 < R_{21} < .6196 \ L_1$ $5.3860 \ L_1 < -R_{22} < 5.4948 \ L_1$ $16.7893 \ L_1 < R_{23} < 17.1283 \ L_1$ $1.5389 \ L_1 < -R_{24} < 1.5699 \ L_1$ $1.5361 \ L_1 < -R_{25} < 1.5671 \ L_1$ $3.9379 \ L_1 < -R_{26} < 4.0203 \ L_1$ $.1676 \ L_1 < t_1 < .1709 \ L_1$ $.3631 \ L_1 < t_2 < .3704 \ L_1$ $.1676 \ L_1 < t_3 < .1709 \ L_1$ $.1955 \ L_1 < t_4 < .1994 \ L_1$ $.2933 \ L_1 < t_5 < .2992 \ L_1$ $.1955 \ L_1 < t_6 < .1994 \ L_1$ $.1676 \ L_1 < t_7 < .1709 \ L_1$ $.2374 \ L_1 < t_8 < .2422 \ L_1$ $.1676 \ L_1 < t_9 < .1709 \ L_1$ $.0559 \ L_1 t_{10} < .0570 \ L_1$ $.0559 \ L_1 < t_{11} < .0570 \ L_1$ $.1326 \ L_1 < t_{12} < .1353 \ L_1$ $.0768 \ L_1 < t_{13} < .0784 \ L_1$ $.0768 \ L_1 < t_{14} < .0784 \ L_1$ $2.1689\ L_1 < S_1 < 2.2128\ L_1 (5\times)$ $5.2336\ L_1 < S_1 < 5.3393\ L_1 (9\times)$ $3.8408\ L_1 < S_1 < 3.9184\ L_1 (16.5\times)$ $2.9006\ L_1 < S_1 < 2.9592\ L_1 (30\times)$ $.0140\ L_1 < S_2 < .0143\ L_1$ $.0376\ L_1 < S_3 < .0383\ L_1$ $.0179\ L_1 < S_4 < .0182\ L_1$ $.0140\ L_1 < S_5 < .0143\ L_1$ $S_6 > .0069\ L_1$ $.0159\ L_1 < S_7 < .0162\ L_1$ $.0140\ L_1 < S_8 < .0143\ L_1$ $.1528\ L_1 < S_9 < .1559\ L_1 (5\times)$ $.6723\ L_1 < S_9 < .6858\ L_1 (9\times)$ $1.5411\ L_1 < S_9 < 1.5722\ L_1 (16.5\times)$ $2.7364\ L_1 < S_9 < 2.7917\ L_1 (30\times)$ $.6897\ L_1 < S_{11} < .7036\ L_1 (5\times)$ $1.1869\ L_1 < S_{11} < 1.2109\ L_1 (9\times)$ $.0457\ L_1 < S_{11} < .0467\ L_1 (16.5\times)$ $.2518\ L_1 < S_{11} < .2569\ L_1 (30\times)$ $.0279\ L_1 < S_{12} < .0285\ L_1$ $4.3318\ L_1 < S_{13} < 4.4193\ L_1 (5\times)$ $.2505\ L_1 < S_{13} < .2556\ L_1 (9\times)$ $1.5040\ L_1 < S_{13} < 1.5344\ L_1 (16.5\times)$ $1.4544\ L_1 < S_{13} < 1.4838\ L_1 (30\times)$ $.1396\ L_1 < S_{14} < .1425\ L_1$ $.0296\ L_1 < S_{15} < .0302\ L_1$ $2.9616\ L_1 < S_{16} < 3.0214\ L_1$ $.0279\ L_1 < S_{17} < .0285\ L_1$ $18.1946\ L_1 < S_{18} < 18.5622\ L_1$ $1.5130 < n_D(I) < 1.5150$ $1.5130 < n_D(II\ pos.) < 1.5150$ $1.6115 < n_D(II\ neg.) < 1.6145$ $1.6115 < n_D(III) < 1.6145$ $1.5130 < n_D(IV) < 1.5150$ $1.5130 < n_D(V) < 1.5150$ $1.6115 < n_D(VI) < 1.6145$ $1.5130 < n_D(VII) < 1.5150$ $1.5130 < n_D(VIII) < 1.5150$ $1.6115 < n_D(IX) < 1.6145$ $1.6115 < n_D(X\ neg.) < 1.6145$ $1.7490 < n_D(X\ pos.) < 1.7510$ $1.5130 < n_D(XI) < 1.5150$ $1.6115 < n_D(XII) < 1.6145$ $69.7 < \nu(I) < 70.7$ $69.7 < \nu(II\ pos.) < 70.7$ $43.9 < \nu(II\ neg.) < 44.5$ $43.9 < \nu(III) < 44.5$ $69.7 < \nu(IV) < 70.7$ $69.7 < \nu(V) < 70.7$ $43.9 < \nu(VI) < 44.5$ $69.7 < \nu(VII) < 70.7$ $69.7 < \nu(VIII) < 70.7$ $43.9 < \nu(IX) < 44.5$ $43.9 < \nu(X\ neg.) < 44.5$ $27.6 < \nu(X\ pos.) < 28.0$ $69.7 < \nu(XI) < 70.7$ $43.9 < \nu(XII) < 44.5$ 4. A zoom type of projection lens system which includes three differentially movable lens members which are moved between fixed object and image positions according to such a law that the magnification of the image formed is constant in border size although it is varied in magnification through a continuous magnification range of substantially 6, said image being well corrected and substantially stationary, said system including a first axially movable lens group which is spaced from said object surface at a variable axial distance designated $S_1$, a second axially movable lens group which is spaced from said first group at a variable axial distance designated $S_9$, and a third axially movable lens group which is spaced from said second group at a variable axial distance designated $S_{11}$, said groups being optically aligned on one side of the aperture stop of said system on the opposite side from at least one fixed projection lens group which forms said image at a fixed position, said first movable lens group comprising a front singlet meniscus lens member designated I which is concave toward said object surface, a double convex doublet lens member designated II which is spaced rearwardly of member I at a fixed axial distance designated $S_2$, a double concave lens member designated III which has a front surface of short curvature so that it lies in edge contact with lens member II, a double convex lens member designated IV which is spaced at a fixed axial distance designated $S_4$ from member III, another double convex lens member designated V which is spaced at a fixed axial distance designated $S_5$ from member IV, a second double concave lens member designated VI which is spaced at a fixed axial distance designated $S_6$ from member V, a third double convex lens member designated VII which has a refracting surface which is flatter than the adjacent surface of member VI and has edge contact therewith, and a rearmost singlet meniscus lens member designated VIII which is concave toward said images and is spaced at a fixed axial distance designated $S_8$ from member VII, said second movable lens group comprising a front double concave singlet lens member designated IX and a positive meniscus doublet lens member designated X which is concave toward and lies in edge contact with member IX, said third movable lens group comprising a front double convex lens member designated XI and, a rear meniscus lens member designated XII which is concave toward member XI and is spaced therefrom at a fixed axial distance designated $S_{12}$, the variable airspace between member XII and said aperture stop being designated $S_{13}$, the values for the focal lengths F(I) to F(XII) of the successive lens members I to XII respectively being substantially as given in the table herebelow in terms of $L_1$ which represents .1 of the axial length from said object surface to said aperture stop, the minus (—) sign meaning negative focal length and the successive airspaces $S_1$ to $S_{13}$ in said system having values substantially as given in the table herebelow in terms of $L_1$ as well as the substantial values of the lens thicknesses $t_1$ to $t_{14}$ of the successive lens elements, numbered from lens I to lens XII,

```
F(I)   = 5.300 L₁         t₁  = .1692 L₁
F(II)  = 7.037 L₁         t₂  = .3667 L₁
-F(III)= 2.891 L₁         t₃  = .1692 L₁
F(IV)  = 3.294 L₁         t₄  = .1974 L₁
F(V)   = 6.975 L₁         t₅  = .2962 L₁
-F(VI) = 3.018 L₁         t₆  = .1974 L₁
F(VII) = 4.413 L₁         t₇  = .1692 L₁
F(VIII)= 5.529 L₁         t₈  = .2397 L₁
-F(IX) = 0.931 L₁         t₉  = .1692 L₁
F(X)   = 7.529 L₁         t₁₀ = .0564 L₁
F(XI)  = 2.774 L₁         S₉  = .1543 L₁ (5X)
-F(XII)= 4.201 L₁         S₉  = .6790 L₁ (9X)
t₁₁ = .0564 L₁            S₉  = 1.5566 L₁ (16.5X)
t₁₂ = .1340 L₁            S₉  = 2.7640 L₁ (30X)
t₁₃ = .0776 L₁            S₁₀ = .0562 L₁
t₁₄ = .0776 L₁            S₁₁ = .6966 L₁ (5X)
S₁ = 2.1908 L₁ (5X)       S₁₁ = 1.1989 L₁ (9X)
S₁ = 5.2864 L₁ (9X)       S₁₁ = .4620 L₁ (16.5X)
S₁ = 3.8795 L₁ (16.5X)    S₁₁ = .2544 L₁ (30X)
S₁ = 2.9299 L₁ (30X)      S₁₂ = .0282 L₁
S₂ = .0141 L₁             S₁₃ = 4.3756 L₁ (5X)
S₄ = .0181 L₁             S₁₃ = .2531 L₁ (9X)
S₅ = .0141 L₁             S₁₃ = 1.5192 L₁ (16.5X)
S₆ = .0071 L₁             S₁₃ = 1.4691 L₁ (30X)
S₈ = .0141 L₁
```

5. A zoom type of projection lens system which includes three differentially movable lens members which are moved between fixed object and image positions according to such a law that the magnification of the image formed is constant in border size although it is varied in magnification through a continuous magnification range of substantially 6, said image being well corrected and substantially stationary, said system including a first axially movable lens group which is spaced from said object surface at a variable axial distance designated $S_1$, a second axially movable lens group which is spaced from said first group at a variable axial distance designated $S_9$, and a third axially movable lens group which is spaced from said second group at a variable axial distance designated $S_{11}$, said groups being optically aligned on one side of the aperture stop of said system on the opposite side from at least one fixed projection lens group which forms said image at a fixed position, said first movable lens group comprising a front singlet meniscus lens member designated I which is concave toward said object surface, a double convex doublet lens member designated II which is spaced rearwardly of member I at a fixed axial distance designated $S_2$, a double concave lens member designated III which has a front surface of short curvature so that it lies in edge contact with lens member II, a double convex lens member designated IV which is spaced at a fixed axial distance designated $S_4$ from member III, another double convex lens member designated V which is spaced at a fixed axial distance designated $S_5$ from member IV, a second double concave lens member designated VI which is spaced at a fixed axial distance designated $S_6$ from member V, a third double convex lens member designated VII which has a refracting surface which is flatter than the adjacent surface of member VI and has edge contact therewith, and a rearmost singlet meniscus lens member designated VIII which is concave toward said images and is spaced at a fixed axial distance designated $S_8$ from member VII, said second movable lens group comprising a front double concave singlet lens member designated IX and a positive meniscus doublet lens member designated X which is concave toward and lies in edge contact with member IX, said third movable lens group comprising a front double convex lens member designated XI and, a rear meniscus lens member designated XII which is concave toward member XI and is spaced therefrom at a fixed axial distance designated $S_{12}$, the variable airspace between member XII and said aperture stop being designated $S_{13}$, the values for the focal lengths F(I) to F(XII) of the successive lens members I to XII respectively being substantially as given in the table herebelow in terms of $L_1$ which represents .1 of the axial length from said object surface to said aperture stop, the minus (—) sign meaning negative focal length and the successive airspaces $S_1$ to $S_{13}$ in said system having values substantially as given in the table herebelow in terms of $L_1$ as well as the substantial values of the lens thicknesses $t_1$ to $t_{14}$ of the successive lens elements, numbered from lens I to lens XII, the specific absolute values for the refractive index $n_D$ and Abbe number $\nu$ for the successive lens elements of the lens members I to XII being given substantially in the table herebelow,

```
n_D (I)       = 1.514
n_D (II pos.) = 1.514
n_D (II neg.) = 1.613
n_D (III)     = 1.613
n_D (IV)      = 1.514
n_D (V)       = 1.514
n_D (VI)      = 1.613
n_D (VII)     = 1.514
n_D (VIII)    = 1.514
n_D (IX)      = 1.613
n_D (X neg.)  = 1.613
n_D (X pos.)  = 1.751
n_D (XI)      = 1.514
n_D (XII)     = 1.613
ν (I)         = 70.2
ν (II pos.)   = 70.2
ν (II neg.)   = 44.2
ν (III)       = 44.2
ν (IV)        = 70.2
ν (V)         = 70.2
ν (VI)        = 44.2
ν (VII)       = 70.2
ν (VIII)      = 70.2
ν (IX)        = 44.2
ν (X neg.)    = 44.2
ν (X pos.)    = 27.8
ν (XI)        = 70.2
ν (XII)       = 44.2
```

```
F(I)   = 5.300 L₁         S₁ = 2.1908 L₁ (5X)
F(II)  = 7.037 L₁         S₁ = 5.2864 L₁ (9X)
-F(III)= 2.891 L₁         S₁ = 3.8795 L₁ (16.5X)
F(IV)  = 3.294 L₁         S₁ = 2.9299 L₁ (30X)
F(V)   = 6.975 L₁         S₂ = .0141 L₁
-F(VI) = 3.018 L₁         S₄ = .0181 L₁
F(VII) = 4.413 L₁         S₅ = .0141 L₁
F(VIII)= 5.529 L₁         S₆ = .0071 L₁
-F(IX) = 0.931 L₁         S₈ = .0141 L₁
F(X)   = 7.529 L₁         S₉ = .1543 L₁ (5X)
F(XI)  = 2.774 L₁         S₉ = .6970 L₁ (9X)
-F(XII)= 4.201 L₁         S₉ = 1.5566 L₁ (16.5X)
t₁  = .1692 L₁            S₉ = 2.7640 L₁ (30X)
t₂  = .3667 L₁            S₁₀ = .0562 L₁
t₃  = .1692 L₁            S₁₁ = .6966 L₁ (5X)
t₄  = .1974 L₁            S₁₁ = 1.9889 L₁ (9X)
t₅  = .2962 L₁            S₁₁ = .4620 L₁ (16.5X)
t₆  = .1974 L₁            S₁₁ = .2544 L₁ (30X)
t₇  = .1692 L₁            S₁₂ = .0282 L₁
t₈  = .2397 L₁            S₁₃ = 4.3756 L₁ (5X)
t₉  = .1692 L₁            S₁₃ = .2531 L₁ (9X)
t₁₀ = .0564 L₁            S₁₃ = 1.5192 L₁ (16.5X)
t₁₁ = .0564 L₁            S₁₃ = 1.4691 L₁ (30X)
t₁₂ = .1340 L₁
t₁₃ = .0776 L₁
t₁₄ = .0776 L₁
```

6. A zoom type of projection lens system which includes three differentially movable lens members which are moved between fixed object and image positions according to such a law that the magnification of the image formed is constant in border size although it is varied in magnification through a continuous magnification range of substantially 6, said image being well corrected and substantially stationary, said system including a first axially movable lens group which is spaced from said object surface at a variable axial distance designated $S_1$, a second axially movable lens group which is spaced from said first group at a variable axial distance designated $S_9$, and a third axially movable lens group which is spaced from said second group at a variable axial distance designated $S_{11}$, said groups being optically aligned on one side of the aperture stop of said system on the opposite side from at least one fixed projection lens group which forms said image at a fixed position, said first movable lens group comprising a front singlet meniscus lens member designated I which is concave toward said object surface, a double convex doublet lens member designated II which is spaced rearwardly of member I at a fixed axial distance designated $S_2$, a double concave lens member designated III which has a front surface of short curvature so that it lies in edge contact with lens member II, a double convex lens member designated IV which is spaced at a fixed axial distance designated $S_4$ from member III, another double convex lens member designated V which is spaced at a fixed axial distance designated $S_5$ from member IV, a second double concave lens member designated VI which is spaced at a fixed axial distance designated $S_6$ from member V, a third double convex lens member designated VII which has a refracting surface which is flatter than the adjacent surface of member VI and has edge contact therewith, and a rearmost singlet meniscus lens member designated VIII which is concave toward said images and is spaced at a fixed axial distance designated $S_8$ from member VII, said second movable lens group comprising a front double concave singlet lens member designated IX and a positive meniscus doublet lens member designated X which is concave toward and lies in edge contact with member IX, said third movable lens group comprising a front double convex lens member designated XI and, a rear meniscus lens member designated XII which is concave toward member XI and is spaced therefrom at a fixed axial distance designated $S_{12}$, the variable airspace between member XII and said aperture stop being designated $S_{13}$, the specific values for the radii which are designated $R_1$ to $R_{26}$ respectively for the successive lens members I to XII being given in terms of $L_1$ which represents one-tenth of the axial length between the object plane and the aperture stop of said system, the minus (—) sign being used for those lens surfaces whose centers of curvature lie on the front side of the respective surfaces, the values furthermore being given in terms of $L_1$ for the successive airspaces designated $S_1$ to $S_{13}$, the specific values of the successive axial thicknesses of lens members I to XII which are designated $t_1$ to $t_{14}$ being given in the table in terms of $L_1$ along with the absolute values of refractive index $n_D$ and Abbe number $\nu$ for the aforesaid lenses,

| | |
|---|---|
| $-R_1 = 6.6196\ L_1$ | $R_{16} = 2.5573\ L_1$ |
| $-R_2 = 1.9465\ L_1$ | $R_{17} = 24.9679\ L_1$ |
| $R_3 = 9.2339\ L_1$ | $-R_{18} = 1.1765\ L_1$ |
| $-R_4 = 1.7025\ L_1$ | $R_{19} = 1.1295\ L_1$ |
| $-R_5 = 4.2146\ L_1$ | $-R_{20} = 2.6377\ L_1$ |
| $-R_6 = 2.8404\ L_1$ | $R_{21} = 0.6136\ L_1$ |
| $R_7 = 4.8460\ L_1$ | $-R_{22} = 5.4404\ L_1$ |
| $R_8 = 3.9029\ L_1$ | $R_{23} = 16.9588\ L_1$ |
| $-R_9 = 2.9130\ L_1$ | $-R_{24} = 1.5544\ L_1$ |
| $R_{10} = 9.0542\ L_1$ | $-R_{25} = 1.5516\ L_1$ |
| $-R_{11} = 5.8861\ L_1$ | $-R_{26} = 3.9805\ L_1$ |
| $-R_{12} = 6.0808\ L_1$ | |
| $R_{13} = 2.6878\ L_1$ | |
| $R_{14} = 3.0576\ L_1$ | |
| $-R_{15} = 8.5634\ L_1$ | |

$t_1 = .1692\ L_1$
$t_2 = .3667\ L_1$
$t_3 = .1692\ L_1$
$t_4 = .1974\ L_1$
$t_5 = .2962\ L_1$
$t_6 = .1974\ L_1$
$t_7 = .1692\ L_1$
$t_8 = .2397\ L_1$
$t_9 = .1692\ L_1$
$t_{10} = .0564\ L_1$
$t_{11} = .0564\ L_1$
$t_{12} = .1340\ L_1$
$t_{13} = .0776\ L_1$
$t_{14} = .0776\ L_1$

| | |
|---|---|
| $S_1 = 2.1908\ L_1\ (5\times)$ | $S_3 = .0380\ L_1$ |
| $S_1 = 5.2864\ L_1\ (9\times)$ | $S_4 = .0181\ L_1$ |
| $S_1 = 3.8795\ L_1\ (16.5\times)$ | $S_5 = .0141\ L_1$ |
| $S_1 = 2.9299\ L_1\ (30\times)$ | $S_6 = .0071\ L_1$ |
| $S_2 = .0141\ L_1$ | $S_7 = .0160\ L_1$ |
| $S_8 = .0141\ L_1$ | $n_D\ (X\ neg.) = 1.613$ |
| $S_9 = .1543\ L_1\ (5\times)$ | $n_D\ (X\ pos.) = 1.751$ |
| $S_9 = .6790\ L_1\ (9\times)$ | $n_D\ (XI) = 1.514$ |
| $S_9 = 1.5566\ L_1\ (16.5\times)$ | $n_D\ (XII) = 1.613$ |
| $S_9 = 2.7640\ L_1\ (30\times)$ | $\nu\ (I) = 70.2$ |
| $S_{10} = .0562\ L_1$ | $\nu\ (II\ pos.) = 70.2$ |
| $S_{11} = .6966\ L_1\ (5\times)$ | $\nu\ (II\ neg.) = 44.2$ |
| $S_{11} = 1.1989\ L_1\ (9\times)$ | $\nu\ (III) = 44.2$ |
| $S_{11} = .4620\ L_1\ (16.5\times)$ | $\nu\ (IV) = 70.2$ |
| $S_{11} = .2544\ L_1\ (30\times)$ | $\nu\ (V) = 70.2$ |
| $S_{12} = .0282\ L_1$ | $\nu\ (VI) = 44.2$ |
| $S_{13} = 4.3756\ L_1\ (5\times)$ | $\nu\ (VII) = 70.2$ |
| $S_{13} = .2531\ L_1\ (9\times)$ | $\nu\ (VIII) = 70.2$ |
| $S_{13} = 1.5192\ L_1\ (16.5\times)$ | $\nu\ (IX) = 44.2$ |
| $S_{13} = 1.4691\ L_1\ (30\times)$ | $\nu\ (X\ neg.) = 44.2$ |
| $n_D\ (I) = 1.514$ | $\nu\ (X\ pos.) = 27.8$ |
| $n_D\ (II\ pos.) = 1.514$ | $\nu\ (XI) = 70.2$ |
| $n_D\ (II\ neg.) = 1.613$ | $\nu\ (XII) = 44.2$ |
| $n_D\ (III) = 1.613$ | |
| $n_D\ (IV) = 1.514$ | |
| $n_D\ (V) = 1.514$ | |
| $n_D\ (VI) = 1.613$ | |
| $n_D\ (VII) = 1.514$ | |
| $n_D\ (VIII) = 1.514$ | |
| $n_D\ (IX) = 1.613$ | |

7. A zoom type of projection lens system which includes three differentially movable lens members which are moved between fixed object and image positions according to such a law that the magnification of the image formed is constant in border size although it is varied in magnification through a continuous magnification range of substantially 6, said image being well corrected and substantially stationary, said system including, a first axially movable lens group which is spaced from said object surface at a variable axial distance designated $S_1$, a second axially movable lens group which is spaced from said first group at a variable axial distance designated $S_9$, a third axially movable lens group which is spaced from said second group at a variable axial distance designated $S_{11}$, said groups being optically aligned on the front side of the aperture stop of said system at a variable axial distance designated $S_{13}$ from said stop, and a stationary group of projection lenses comprising a front pair of lenses which include a front double convex lens element designated XIII which is located at a fixed axial distance designated $S_{14}$ rearwardly from said aperture stop and is followed by a negative meniscus lens element designated XIV with an airspace $S_{15}$ lying therebetween, said stationary group further comprising a rear pair of lenses which include a front positive meniscus lens element designated XV which is concave toward the front and is spaced at a fixed distance $S_{16}$ from element XIV, and further includes a rear double concave lens element designated XVI which is spaced from element XV by an airspace designated $S_{17}$, said system forming a fixed image at a stationary plane which is located at an axial distance rearwardly therefrom designated $S_{18}$, said first movable lens group comprising a front singlet meniscus lens member designated I which is concave toward said object surface, a double convex doublet lens member designated II which is spaced rearwardly of member I at a fixed axial distance designated $S_2$, a double concave lens member designated III which has a front surface of short curvature so that it lies in edge contact with lens member II, a double convex lens member designated IV which is spaced at a fixed axial distance designated $S_4$ from member III, another double convex lens member designated V which is spaced at a fixed axial distance designated $S_5$ from member IV, a second double concave lens member designated VI which is spaced at a fixed axial distance designated $S_6$ from member V, a third double convex lens member designated VII which has a refracting surface which is flatter than the adjacent surface of member VI and has edge contact therewith, and a rearmost singlet meniscus lens member designated VIII which is concave toward said images and is spaced at a fixed axial distance designated $S_8$ from member VII, said second movable lens group comprising a front double concave singlet lens member designated IX and a positive meniscus doublet lens member designated X which is concave toward and lies in edge contact with member IX, said third movable lens group comprising a front double convex lens member designated XI and, a rear meniscus lens member designated XII which is concave toward member XI and is spaced therefrom at a fixed axial distance designated $S_{12}$, the variable airspace between member XII and said aperture stop being designated $S_{13}$, the values for the focal lengths F(I) to F(XVI) of the successive lens members I to XVI respectively being substantially as given in the table herebelow in terms of $L_1$ which represents .1 of the axial length from said object surface to said aperture stop, the minus (—) sign meaning negative focal length, the values furthermore being given in terms of $L_1$ substantially for the successive airspaces $S_1$ to $S_{18}$, the successive axial thicknesses $t_1$ to $t_{14}$ of the aforesaid lens members, $t_2$ and $t_3$ being related to the positive and negative lens elements respectively in member II, and $t_{11}$ and $t_{12}$ being related to the negative and positive lens elements respectively in member X, the corresponding values for the refractive index $n_D$ and Abbe number $\gamma$ being given for the successive lens parts herebelow in absolute values, $5.247\ L_1 < F(I) < 5.353\ L_1$ $6.967\ L_1 < F(II) < 7.107\ L_1$ $2.863\ L_1 < -F(III) < 2.921\ L_1$ $3.261\ L_1 < F(IV) < 3.327\ L_1$ $6.905\ L_1 < F(V) < 7.045\ L_1$ $2.987\ L_1 < -F(VI) < 3.048\ L_1$ $4.369\ L_1 < F(VII) < 4.457\ L_1$ $5.473\ L_1 < F(VIII) < 5.584\ L_1$ $0.922\ L_1 < -F(IX) < 0.941\ L_1$ $7.454\ L_1 < F(X) < 7.604\ L_1$ $2.747\ L_1 < F(XI) < 2.802\ L_1$ $4.159\ L_1 < -F(XII) < 4.243\ L_1$ $1.065\ L_1 < F(XIII) < 1.086\ L_1$ $1.628\ L_1 < F(XIV) < 1.661\ L_1$ $1.178\ L_1 < F(XV) < 1.201\ L_1$ $0.686\ L_1 < -F(XVI) < 0.700\ L_1$ $2.1689\ L_1 < S_1 < 2.2128\ L_1\ (5\times)$ $5.2336\ L_1 < S_1 < 5.3393\ L_1\ (9\times)$ $3.8408\ L_1 < S_1 < 3.9184\ L_1\ (16.5\times)$ $2.9006\ L_1 < S_1 < 2.9592\ L_1\ (30\times)$ $.0140\ L_1 < S_2 < .0143\ L_1$ $.0179\ L_1 < S_4 < .0182\ L_1$ $.0140\ L_1 < S_5 < .0143\ L_1$ $S_6 > .0069\ L_1$ $.0140\ L_1 < S_8 < .0143\ L_1$ $.1528\ L_1 < S_9 < .1559\ L_1\ (5\times)$ $.6723\ L_1 < S_9 < .6858\ L_1\ (9\times)$ $1.5411\ L_1 < S_9 < 1.5722\ L_1\ (16.5\times)$ $2.7364\ L_1 < S_9 < 2.7917\ L_1\ (30\times)$ $.6897\ L_1 < S_{11} < .7036\ L_1\ (5\times)$ $1.1869\ L_1 < S_{11} < 1.2109\ L_1\ (9\times)$ $.0457\ L_1 < S_{11} < .0467\ L_1\ (16.5\times)$ $.2518\ L_1 < S_{11} < .2569\ L_1\ (30\times)$ $.0279\ L_1 < S_{12} < .0285\ L_1$ $4.3318\ L_1 < S_{13} < 4.4193\ L_1\ (5\times)$ $.2505\ L_1 < S_{13} < .2556\ L_1\ (9\times)$ $1.5040\ L_1 < S_{13} < 1.5344\ L_1\ (16.5\times)$ $1.4544\ L_1 < S_{13} < 1.4838\ L_1\ (30\times)$ $.1396\ L_1 < S_{14} < .1425\ L_1$ $.0296\ L_1 < S_{15} < .0302\ L_1$ $2.9616\ L_1 < S_{16} < 3.0214\ L_1$ $.0279\ L_1 < S_{17} < .0285\ L_1$ $18.1946\ L_1 < S_{18} < 18.5622\ L_1$ $.1676\ L_1 < t_1 < .1709\ L_1$ $.3631\ L_1 < t_2 < .3704\ L_1$ $.1676\ L_1 < t_3 < .1709\ L_1$ $.1955\ L_1 < t_4 < .1994\ L_1$ $.2933\ L_1 < t_5 < .2992\ L_1$ $.1955\ L_1 < t_6 < .1994\ L_1$ $.1676\ L_1 < t_7 < .1709\ L_1$ $.2374\ L_1 < t_8 < .2422\ L_1$ $.1676\ L_1 < t_9 < .1709\ L_1$ $.0559\ L_1 < t_{10} < .0570\ L_1$ $.0559\ L_1 < t_{11} < .0570\ L_1$ $.1326\ L_1 < t_{12} < .1353\ L_1$ $.0768\ L_1 < t_{13} < .0784\ L_1$ $.0768\ L_1 < t_{14} < .0784\ L_1$ $1.5130 < n_D\ (I) < 1.5150$ $1.5130 < n_D\ (II\ pos.) < 1.5150$ $1.6115 < n_D \text{ (II neg.)} < 1.6145$ $1.6115 < n_D \text{ (III)} < 1.6145$ $1.5130 < n_D \text{ (IV)} < 1.5150$ $1.5130 < n_D \text{ (V)} < 1.5150$ $1.6115 < n_D \text{ (VI)} < 1.6145$ $1.5130 < n_D \text{ (VII)} < 1.5150$ $1.5130 < n_D \text{ (VIII)} < 1.5150$ $1.6115 < n_D \text{ (IX)} < 1.6145$ $1.6115 < n_D \text{ (X neg.)} < 1.6145$ $1.7490 < n_D \text{ (X pos.)} < 1.7510$ $1.5130 < n_D \text{ (XI)} < 1.5150$ $1.6115 < n_D \text{ (XII)} < 1.6145$ $69.7 < \nu \text{ (I)} < 70.7$ $69.7 < \nu \text{ (II pos.)} < 70.7$ $43.9 < \nu \text{ (II neg.)} < 44.5$ $43.9 < \nu \text{ (III)} < 44.5$ $69.7 < \nu \text{ (IV)} < 70.7$ $69.7 < \nu \text{ (V)} < 70.7$ $43.9 < \nu \text{ (VI)} < 44.5$ $69.7 < \nu \text{ (VII)} < 70.7$ $69.7 < \nu \text{ (VIII)} < 70.7$ $43.9 < \nu \text{ (IX)} < 44.5$ $43.9 < \nu \text{ (X neg.)} < 44.5$ $27.6 < \nu \text{ (X pos.)} < 28.0$ $69.7 < \nu \text{ (XI)} < 70.7$ $43.9 < \nu \text{ (XII)} < 44.5$ 8. A zoom type projection lens system as set forth in claim 1 further characterized by
the equivalent focal length of said first movable lens group, said second movable lens group, and said third movable lens group being ideally 2.19 $L_1$, $-1.10$ $L_1$ and 8.15 $L_1$, respectively.

9. A zoom type of projection lens system which includes three differentially movable lens members which are moved between fixed object and image positions according to such a law that the magnification of the image formed is constant in border size although it is varied in magnification through a continuous magnification range of substantially 6, said image being well corrected and substantially stationary, said system including
a first axially movable lens group which is spaced from said object surface at a variable axial distance designated $S_1$,
a second axially movable lens group which is spaced from said first group at a variable axial distance designated $S_9$, and
a third axially movable lens group which is spaced from said second group at a variable axial distance designated $S_{11}$, said groups being optically aligned on one side of the aperture stop of said system on the opposite side from at least one fixed projection lens group which forms said image at a fixed position,
said first movable lens group comprising
a front singlet meniscus lens member designated I which is concave toward said object surface,
a double convex doublet lens member designated II which is spaced rearwardly of member I at a fixed axial distance designated $S_2$, member II being composed of a front double convex lens element IIa which lies in surface contact with a rear negative meniscus lens element IIb,
a double concave lens member designated III which has a front surface of short curvature so that it lies in edge contact with lens member II,
a double convex lens member designated IV which is spaced at a fixed axial distance designated $S_4$ from member III,
another double convex lens member designated V which is spaced at a fixed axial distance designated $S_5$ from member IV,
a second double concave lens member designated VI which is spaced at a fixed axial distance designated $S_6$ from member V,
a third double convex lens member designated VII which has a refracting surface which is flatter than the adjacent surface of member VI and has edge contact therewith, and
a rearmost singlet meniscus lens member designated VIII which is concave toward said images and is spaced at a fixed axial distance designated $S_8$ from member VII,
said second movable lens group comprising a front double concave singlet lens member designated IX and a positive meniscus doublet lens member designated X which is concave toward and lies in edge contact with member IX, member X being composed of a front double concave lens element Xa which lies in surface contact with a rear double convex lens element Xb,
said third movable lens group comprising a front double convex lens member designated XI and,
a rear meniscus lens member designated XII which is concave toward member XI and is spaced therefrom at a fixed axial distance designated $S_{12}$, the variable airspace between member XII and said aperture stop being designated $S_{13}$,
the values for the focal lengths F(I) to F(XII) of the successive lens members I to XII and lens elements IIa, IIb, Xa and Xb respectively being substantially as given in the table herebelow in terms of $L_1$ which represents .1 of the axial length from said object surface to said aperture stop, the minus (−) sign meaning negative focal length and the successive airspaces $S_1$ to $S_1$ in said system having values in terms of $L_1$ as given in said table, $5.247\ L_1 < F(I) < 5.353\ L_1$ $6.967\ L_1 < F(II) < 7.107\ L_1$ $2.863\ L_1 < -F(III) < 2.921\ L_1$ $3.261\ L_1 < F(IV) < 3.327\ L_1$ $6.905\ L_1 < F(V) < 7.045\ L_1$ $2.987\ L_1 < -F(VI) < 3.048\ L_1$ $4.369\ L_1 < F(VII) < 4.457\ L_1$ $5.473\ L_1 < F(VIII) < 5.584\ L_1$ $0.922\ L_1 < F(IX) < 0.941\ L_1$ $7.454\ L_1 < F(X) < 7.604\ L_1$ $2.747\ L_1 < F(XI) < 2.802\ L_1$ $4.159\ L_1 < -F(XII) < 4.243\ L_1$ the individual focal lengths F(IIa) and −F(IIb) of the lens elements IIa and IIb having values which are numerically related to each other as stated herebelow, and likewise the values of the focal lengths −F(Xa) and F(Xb) of the lens elements Xa and Xb being related to each other numerically as stated herebelow, $$\frac{F(IIa)}{F(IIb)} = .59 \text{ (numerically)}$$

$$\frac{F(Xa)}{F(Xb)} = 1.1 \text{ (numerically)}$$

$2.1689\ L_1 < S_1 < 2.2128\ L_1 (5\times)$ $5.2336\ L_1 < S_1 < 5.3393\ L_1 (9\times)$ $3.8408\ L_1 < S_1 < 3.9184\ L_1\ (16.5\times)$ $2.9006\ L_1 < S_1 < 2.9592\ L_1\ (30\times)$ $.0140\ L_1 < S_2 < .0143\ L_1$ $.0179\ L_1 < S_4 < .0182\ L_1$ $.0140\ L_1 < S_5 < .0143\ L_1$ $S_6 > .0069\ L_1$ $.0140\ L_1 < S_8 < .0143\ L_1$ $.1528\ L_1 < S_9 < .1559\ L_1\ (5\times)$ $.6723\ L_1 < S_9 < .6858\ L_1\ (9\times)$ $1.5411\ L_1 < S_9 < 1.5722\ L_1\ (16.5\times)$ $2.7364\ L_1 < S_9 < 2.7917\ L_1\ (30\times)$ $.6897\ L_1 < S_{11} < .7036\ L_1\ (5\times)$ $1.1869\ L_1 < S_{11} < 1.2109\ L_1\ (9\times)$ $.0457\ L_1 < S_{11} < .0467\ L_1\ (16.5\times)$ $.2518\ L_1 < S_{11} < .2569\ L_1\ (30\times)$ $.0279\ L_1 < S_{12} < .0285\ L_1$ $4.3318\ L_1 < S_{13} < 4.4193\ L_1\ (5\times)$ $.2505\ L_1 < S_{13} < .2556\ L_1\ (9\times)$ $1.5040\ L_1 < S_{13} < 1.5344\ L_1\ (16.5\times)$ $1.4544\ L_1 < S_{13} < 1.4838\ L_1\ (30\times)$

References Cited

UNITED STATES PATENTS 3,272,073   9/1966   Klemt et al.

DAVID SCHONBERG, Primary Examiner

P. A. SACHER, Assistant Examiner